Figure 1:
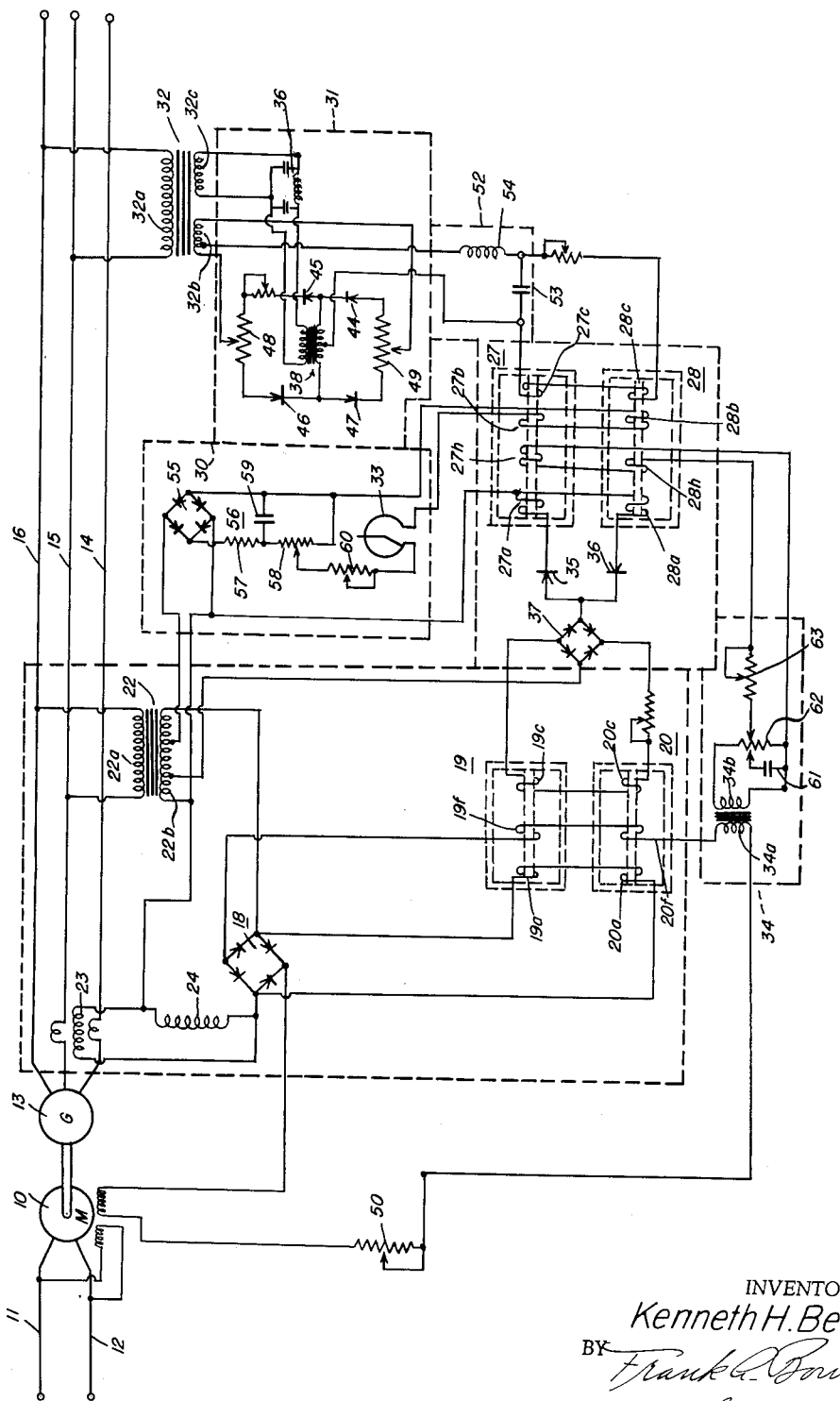

May 23, 1961  K. H. BEEBER  2,985,815
SPEED REGULATOR FOR MOTOR DRIVEN GENERATORS
Filed March 18, 1958  2 Sheets-Sheet 1

INVENTOR.
Kenneth H. Beeber
BY Frank G. Power
his Attorney

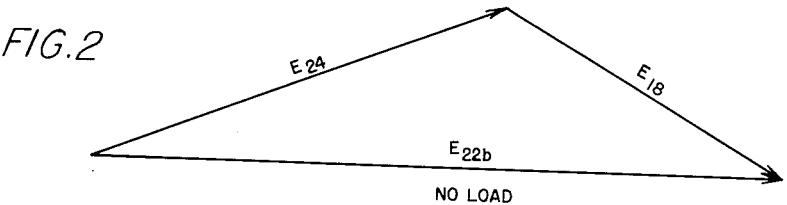
FIG.2 — NO LOAD
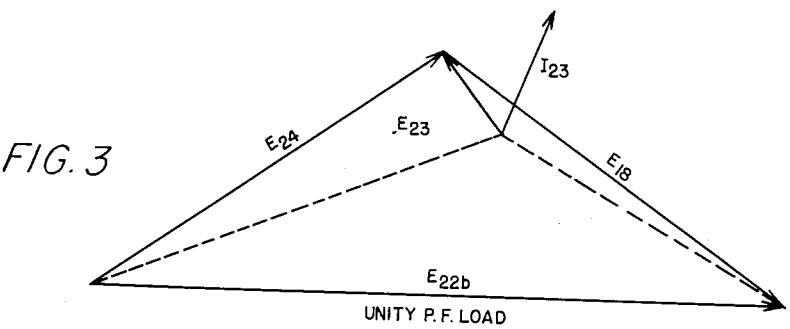
FIG.3 — UNITY P.F. LOAD
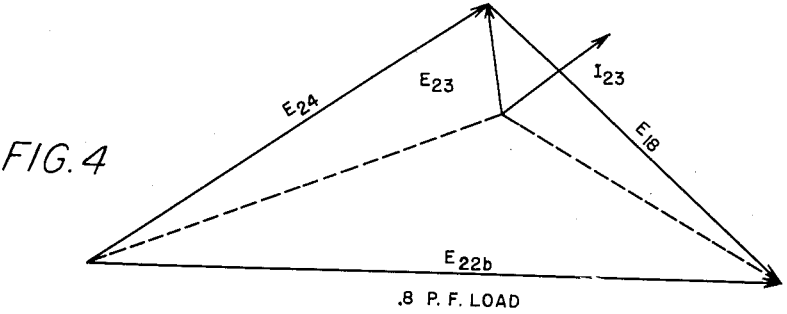
FIG.4 — .8 P.F. LOAD
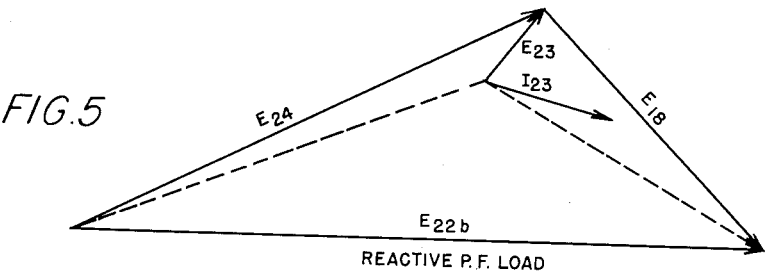
FIG.5 — REACTIVE P.F. LOAD

United States Patent Office 2,985,815
Patented May 23, 1961

2,985,815

SPEED REGULATOR FOR MOTOR DRIVEN GENERATORS

Kenneth H. Beeber, Mount Vernon, N.Y., assignor to Ward Leonard Electric Co., Mount Vernon, N.Y., a corporation of New York Filed Mar. 18, 1958, Ser. No. 722,243

4 Claims. (Cl. 322—32)

This invention relates to a speed regulator for a motor-generator combination to maintain the frequency of the output of the generator constant.

An object of the invention is to provide a speed and frequency regulator for an electric motor-generator set which maintains the frequency of the output within narrow limits over wide variations of output load.

Another object of the invention is to provide a speed and frequency regulator for an electric motor-generator set which automatically operates on energization of the motor windings without utilizing moving elements to initiate or maintain the operation of the regulator.

Another object of the invention is to provide a frequency regulator for an electric motor-generator set which, in the starting operation, permits a full motor field flux and which accelerates the motor to the desierd speed after the completion of the motor energization.

Other and further objects of the invention will become apparent from the following description taken in connection with the drawings in which Fig. 1 illustrates a schematic diagram of the circuit, and Figs. 2–5 illustrate vectorial diagrams of the corrective voltages.

A direct current motor 10 is supplied with direct current by the power lines 11 and 12 and drives a three-phase alternating current generator 13 providing three-phase voltage and current to the output electrical lines 14, 15 and 16. The frequency of the output voltage and current is directly related to and dependent upon the speed of the motor 10. The motor 10 has a main field winding 10a connected to the lines 11 and 12 and a direct current bucking field winding 17. The winding 17 receives a direct current from the speed regulator to vary the speed of the motor.

The main field winding 10a is supplied with a direct current from the power lines. This current creates the main field in the motor. This field is of a high flux density and the motor rotates at a slow speed which is less than the speed required for the desired frequency. The bucking field current supplied by the regulator is in opposition to the main field and reduces the total field flux in the motor. Therefore, on an increase in bucking field current the motor speeds up and on a decrease in bucking field current the motor slows down. The motor-generator set is intended to rotate at a given speed to generate an output with a fixed frequency. This speed is to be maintained constant over a wide range of loads and input voltages to the motor and variations in the characteristic of the motor-generator set.

The direct field current is supplied by the rectifier 18. The voltage E18 (Figs. 2–5) across the input of the rectifier 18 determines this field current and is controlled by the voltages of the power transformer 22, current transformer 23 and reactor 24 and by the impedance of the anode windings 19a and 20a connected across the input of the rectifier. As this input voltage increases, the output rectifier current increases, which decreases the field of the motor and increases the speed of the motor. As the real component load on the generator increases, the input voltage E18 is caused to increase and to correspondingly increase the bucking field current and maintain the motor on frequency. As indicated in the vector diagrams (Figs. 2–5) the rectifier voltage E18 is immediately controlled by the voltage or impedance of the windings 19a and 20a and the voltage E24 of the reactor. The impedance of the windings 19a and 20a is controlled by the frequency responsive circuit which has its output connected to the control windings 19c and 20c of the saturable reactors 19 and 20.

The combination of the current transformer, power transformer and reactor forms a load compensating circuit which supplies the field bucking current required to maintain the prescribed motor speed. This circuit is responsive to variations in the load current delivered by the generator 13, and also provides a general establishment within the regulator of the speed at which the motor is to operate. The frequency responsive circuit provides a finer control of the frequency, and in combination with the load compensating circuit provides a fine and accurate control of the frequency of the output of the generator. The frequency responsive circuit compensates for variations in frequency caused by changes in load current, temperature of the motor-generator, input motor voltage, output generator voltage, and other conditions producing variations in the speed of the motor.

Considering the load compensating circuit in greater detail, the power transformer 22 comprises a primary winding 22a connected across two of the main lines and a secondary winding 22b connected across the rectifier 18 and the reactor 24 in series. Thus, the power transformer 22 provides a voltage to the rectifier as modified by the voltage of the reactor 24. These voltages are modified by the current transformer 23 which is coupled to the output of the generator to impress the real component of the output voltage across the reactor 24. The reactor voltage E24 is a composite voltage resulting from the combination of the impedance of the reactor and the current passing through the rectifier 18 and the windings 19a and 20a and the voltage impressed by the current transformer. The reactor voltage E24 is at an angle to the input voltage of the secondary winding 22b and the voltage E18 across the rectifier E is at approximately 120° to 130° to the reactor voltage. This relationship is illustrated in Fig. 2 of the drawings showing the zero load vector relationship of the voltages. On application of load to the generator, the current transformer produces a voltage E23. The current transformer 23 and the reactor 24 are phased to relate the current transformer voltage and the reactor voltage so that the voltages are almost in quadrature and the current transformer voltage E23 and the rectifier voltage E18 are nearly in phase at unity power factor. This relation is illustrated in Figs. 3 and 4 showing vector diagram for unity power factor and a .8 power factor. This relationship of the current transformer voltage to the rectifier voltage permits the reactive component of the load in the generator to vary without producing any appreciable variation in the rectifier voltage and bucking field current. Therefore, the generator output current may vary due to a change in power factor without changing the speed of the motor-generator. The reactive component of the voltage is nearly normal to the rectifier voltage and, therefore, its appearance has hardly any effect. The rectifier voltage is, therefore, dependent on the real component of load only to control the field current and the speed of the motor. In Fig. 5 a zero power factor load relationship is illustrated. The voltage E23 has shifted ninety degrees. In this relationship the rectifier voltage E18 is substantially equal to the no load value of the rectifier voltage. At zero power factor there is little real load on the generator and the motor power requirements are substantially the same as at no load. Therefore, the bucking field current should be substantially the same.

The general operating range of the loads is from unity to a .8 power factor and in this range the real component of the voltage E23 vectorially adds to the rectifier voltage E18 so that variations due to power factor do not affect the speed of the motor and the motor remains at the proper speed. Thus, if the increased output current is due to a reactive load with no increase in the real load, the voltage of the rectifier 18 is not materially affected and the field current stays substantially the same. The increase in generator output due to an increase in reactive load will not be reflected in the field current since there is no real increase on the power demand of the motor.

The impedance of the anode windings 19a and 20a is controlled by the feedback windings 19f and 20f and the control windings 19c and 20c. The feedback windings 19f and 20f are in series with the output of the rectifier and pass the field current therethrough to sharpen the response of the regulator to variations in frequency. The main variation in the impedance in the windings is produced by the control windings. By varying the impedance, the current supplied by the secondary winding 22b may be shunted around the rectifier 18. The change in impedance varies the voltage across the rectifier and the windings due to the voltage drop across rector 24. Since the bucking field current is directly responsive to the rectifier voltage E18, the bucking field current correspondingly changes. Thus, the bucking field current is responsive to the changes in the frequency of the output line voltage.

The bucking field current passes through the feedback windings 19f and 20f, the primary winding 34a of the anti-hunt transformer 34 and the adjustable resistor 50. As previously mentioned, the feedback windings 19f and 20f sharpen the frequency sensitivity of the variations. The function of the antihunt circuit is to anticipate the variations to apply counter-response to the frequency responsive circuit when a variation occurs. The resistor 50 permits a general adjustment of the bucking field current and does not provide any corrective action.

The frequency responsive circuit comprises a demodulator 31, a magnetic amplifier 25 and a bias circuit 30. The magnetic amplifier 25 has reactors 27 and 28 with control windings 27c and 28c connected to the demodulator 31 and bias windings 27b and 28b connected to the bias circuit 30, and antihunt windings 27h and 28h connected to the antihunt circuit and anode windings 27a and 28a connected through doubler rectifiers 35 and 36 to a full-wave rectifier 37. The rectifier 37 is connected to the control windings 19c and 20c.

The demodulator 31 comprises a transformer 32 having a primary winding 32a connected across the output of the generator and secondary windings 32b and 32c. The winding 32b provides a reference voltage and the winding 32c is connected to a low pass filter network 36. This network has a phase-shifting characteristic on variation in the frequency applied to the filter. The demodulator has rectifiers 44 and 45 connected in series and rectifiers 46 and 47 connected in series, with the resistance 48 between the rectifiers 45 and 46 and the resistance 49 between the rectifiers 44 and 47. The reference voltage supplied by the winding 32b is impressed at intermediate points on the resistors 48 and 49. The output of the filter network 36 is connected to the primary winding of the transformer 38. The secondary winding of transformer 38 is connected from between rectifiers 44 and 45 to between the rectifiers 46 and 47. The frequency responsive signal is tapped from an intermediate point on the reference winding 32b and the secondary winding. A direct current signal is tapped from these points and has a large alternating current component. A filter 52 comprises a condenser 53 and a reactor 54 provided to remove this alternating current component. The direct current signal produced by the demodulator varies linearly with the frequency of the output. The demodulator sensing circuit responds primarily to the phase relation of the outputs of transformers 32 and 38. These transformers are supplied from a common supply, so changes in supply voltage affect each equally. By this means the frequency sensing system is made highly independent of supply voltage disturbance. The current is passed through the control windings 27c and 28c to vary the output of the magnetic amplifier and the output of the rectifier 37 in response thereto to correspondingly vary the impedance of the anode windings. On an increase in frequency, the impedance of the anode windings is reduced to pass more current from the secondary winding 22a and reduce the output of the rectifier 18, and on a decrease in frequency the impedance of the anode windings 19a and 20a increases to increase the output of the rectifier 18.

The bias circuit 30 comprises a full-wave rectifier 55 connected to a portion of the secondary winding 22a of the power transformer and has a filter 56 comprising resistors 57 and 58 and a condenser 59. A rheostat 33 is connected in series with the bias windings 27b and 28b to adjust the level of the bias current. By adjusting the rheostat 33 the speed of the motor 10 may be adjusted to produce the proper frequency in the output of the generator. The resistors 58 and 60 are adjustable to provide a coarse adjustment of the bias current. The rheostat 33 is mounted on a control panel for a fine adjustment of the bias current for adjusting the frequency regulator precisely at the desired frequency.

In the output of the antihunt circuit 34 is a condenser 61 and resistors 62 and 63. The D.C. field current passes through the primary winding 34a and any variations in the current are transmitted to the secondary winding 34b to provide a dampening of the regulator frequency response. The condenser 61 causes the antihunt correction to lead the variation in the field current, thereby providing prompt antihunt action.

The reactors 19 and 20 and the magnetic amplifier 25 are operated over the linear portion of the saturation curves. The demodulator across the output terminals of the filter 52 provides a direct current which varies linearly with the variation in frequency of the output of the generator. These linear variations are amplified by the magnetic amplifier 25 and applied to the control windings 19c and 20c of the saturable reactors which produces a linear variation of the alternating current passing through the anode windings 19a and 20a. Thus, a proportional variation is applied to the bucking field current.

It is thus seen that the frequency regulator maintains a field of the motor in direct response to the output of the generator so that any changes in the frequency are immediately sensed to correspondingly adjust the field of the motor and maintain the generator at the proper frequency. The value of the field current supplied to the bucking winding is dependent on the load compensating circuit and the frequency responsive circuit. The load compensating circuit adjusts the field current in response to the variations in the real load applied to the generator. Thus, if the real load is increased, the field current will correspondignly increase to speed up the motor in order to compensate for the retarding effect of the heavy current drawn under the high real load. If the real load decreases, the field current decreases and the motor speed remains constant. Thus, the load compensating circuit maintains the level of the field current and the frequency response to the real component of the output voltage. The frequency responsive circuit provides the main corrective action to maintain the generator at the proper frequency at any value of the real load. Thus, if there is an increase in the real load and a corresponding variation in a characteristic of the system which would cause an increase in frequency, the correction applied by the load compensating circuit and the correction applied by the frequency responsive circuit would be in opposition. On the other hand, if a variation occurs in a characteristic of the system with the same real component of the output voltage, a correction in the speed of the motor will result. Thus, the load compensating circuit and the frequency responsive circuit interact and cooperate to maintain the generator at the proper frequency.

The regulator has other desirable features in addition to maintaining the generator on frequency within narrow limits. The speed and frequency control is accomplished without the use of any moving parts from the starting up of the motor-generator set until it is shut off. The load compensating circuit comprises inductive units such as the transformer 23, reactor 24 and rectifier 18 and the frequency responsive circuit similarly uses transformers, resistors, capacitors and saturable reactors with dry-disc rectifiers to provide the corrective voltage. The main field winding is connected to the input lines and the bucking field winding is directly connected to the regulator at all times. Thus, there are no mechanical contacts or elements to be maintained and physically moved. This reduces the cost of maintaining the regulator and increases its speed of response. The coupling of the main winding to the input lines and the bucking field winding to the regulator permits the bucking field winding to apply the full flux to the motor and permits the regulator to come into operation as the motor-generator set approaches the desired speed. Thus, the operation of the regulator is automatically initiated with the energization of the motor-generator set. Two important features of the regulator are its speed of response and its accuracy. The direct response of the load compensating circuit to the variation in the real component of the output voltage is immediately reflected in the field current so that as soon as the real component starts to change, the output of the load compensating circuit starts to change and vary the field current. This provides for a high accuracy in regulation and maintaining of the frequency within narrow limits. The accuracy of the load compensating circuit permits the reduction of the sensitivity in the frequency sensing circuits while maintaining a high accuracy of regulation. This further enhances the ability of the regulator to maintain the generator on frequency without producing instability. In the frequency-sensitive circuit, utilizing the output voltage as it is applied for both the reference voltage and the frequency responsive voltage renders the frequency circuit independent of variations in the output voltage so that it does not have a supply voltage sensitivity.

Various modifications and changes may be made in the foregoing embodiment without departing from the scope of the invention as set forth in the appended claims.

I claim:

1. A speed regulator for maintaining at a desired value the frequency of an alternating current generator driven by a direct current motor having a main field winding connected to the input of the motor comprising a bucking field winding to reduce the field of said motor, rectifying means coupled to said bucking field winding for supplying current to said bucking field winding, saturable reactor windings connected across the input of said rectifying means to control the output thereof in response to variations in the impedance of said windings, a power transformer for supplying current to said rectifying means, a reactor connected in series with said combination rectifying means and saturable reactor winding and said power transformer to vectorially relate the voltage of said reactor and the voltage of said power transformer at an acute angle and the input voltage of said rectifying means at an obtuse angle to the voltage of said reactor, a current transformer connected to said generator output and across said reactor in a phase relation to combine the current transformer voltage nearly in quadrature with the voltage of said reactor to vary the voltage across the rectifying means directly with the real component of said current transformer voltage to vary the speed of the motor with changes in the real load of the generator.

2. A speed regulator as set forth in claim 1 wherein said reactor produces a voltage at an angle of approximately 120 to 130 degrees to the input voltage of said rectifying means.

3. A speed regulator for maintaining at a desired value the frequency of an alternating current generator driven by a direct current motor having a main field winding connected to the input of the motor comprising a bucking field winding to reduce the field of said motor, rectifying means having an input and having an output coupled to said bucking field winding for supplying current thereto, a first control circuit comprising a saturable reactor having control winding and anode windings connected across the input of said rectifying means to vary the output thereof in response to variations in the impedance of said anode windings and a frequency responsive circuit coupled between said output of the generator and said control winding to vary the impedance of said anode windings and thereby the bucking field current in response to variations in frequency and a second control circuit comprising a reactor, a current transformer connected to the output of said generator and across said reactor, a power transformer for supplying current to said rectifying means and connected in series with said reactor and current transformer across the input of said rectifying means to form the sole major vector relating elements in said second control circuit, said current transformer being in phase relation to combine the current transformer voltage nearly in quadrature with said reactor voltage to vary the voltage across the rectifying means directly with the real component of said current transformer voltage to thereby vary the speed of the motor with changes in the real load on the generator.

4. A speed regulator for maintaining at a desired value the frequency of an alternating current generator driven by an electric motor comprising electrical regulating means having an input and adjusting the speed of rotation of the electric motor in response to a control voltage impressed across said input, a control circuit connected across the input of said regulating means comprising a reactor, a current transformer connected to the output of said generator and across said reactor, a power transformer for supplying current to said input and connected in series with said reactor and current transformer across the input of said electrical regulating means to form the major vector relating elements in said control current, said reactor being in series with said power transformer means to vectorially relate the voltage of said reactor and the voltage of said power transformer at an acuate angle and the input voltage of said electrical regulating means at an obtuse angle to said reactor voltage, said current transformer being in phase relation to combine the current transformer voltage nearly in quadrature with said reactor voltage at unity power factors to vary the voltage across the said input directly with the real component of said current transformer voltage to thereby vary the speed of the motor with changes in the real load on the generator over a wide range of power factors of the output of the generator.

References Cited in the file of this patent

UNITED STATES PATENTS

| | | |
|---|---|---|
| 1,710,755 | West | Apr. 30, 1929 |
| 2,635,223 | Grillo | Apr. 14, 1953 |
| 2,691,756 | Schaelchlin et al. | Oct. 12, 1954 |
| 2,721,305 | Steinitz | Oct. 18, 1955 |
| 2,747,156 | Grady | May 22, 1956 |
| 2,754,468 | Grillo | July 10, 1956 |